Dec. 8, 1936.  E. J. VON PEIN  2,063,712

SCALE

Filed Dec. 30, 1933  9 Sheets-Sheet 1

INVENTOR
Edward J. Von Pein
BY
ATTORNEY

Dec. 8, 1936.  E. J. VON PEIN  2,063,712
SCALE
Filed Dec. 30, 1933  9 Sheets-Sheet 3

INVENTOR
Edward J. Von Pein
BY
ATTORNEY

Dec. 8, 1936.    E. J. VON PEIN    2,063,712
SCALE
Filed Dec. 30, 1933    9 Sheets-Sheet 4

INVENTOR
Edward J. Von Pein
BY
ATTORNEY

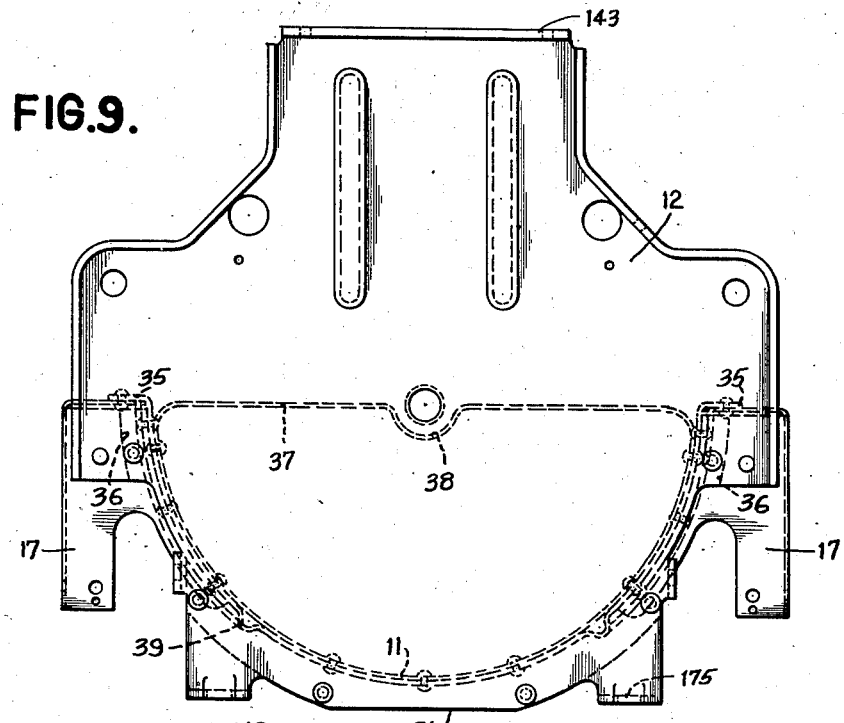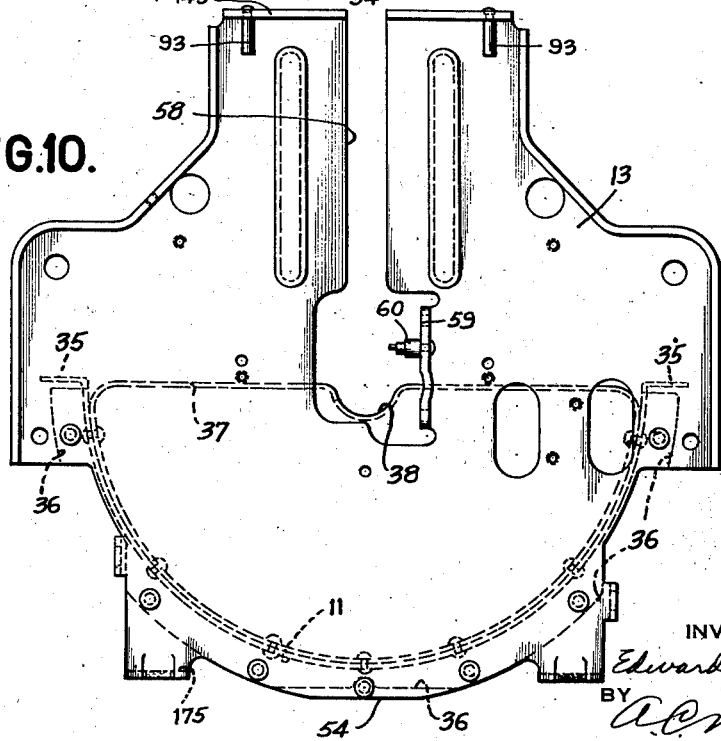

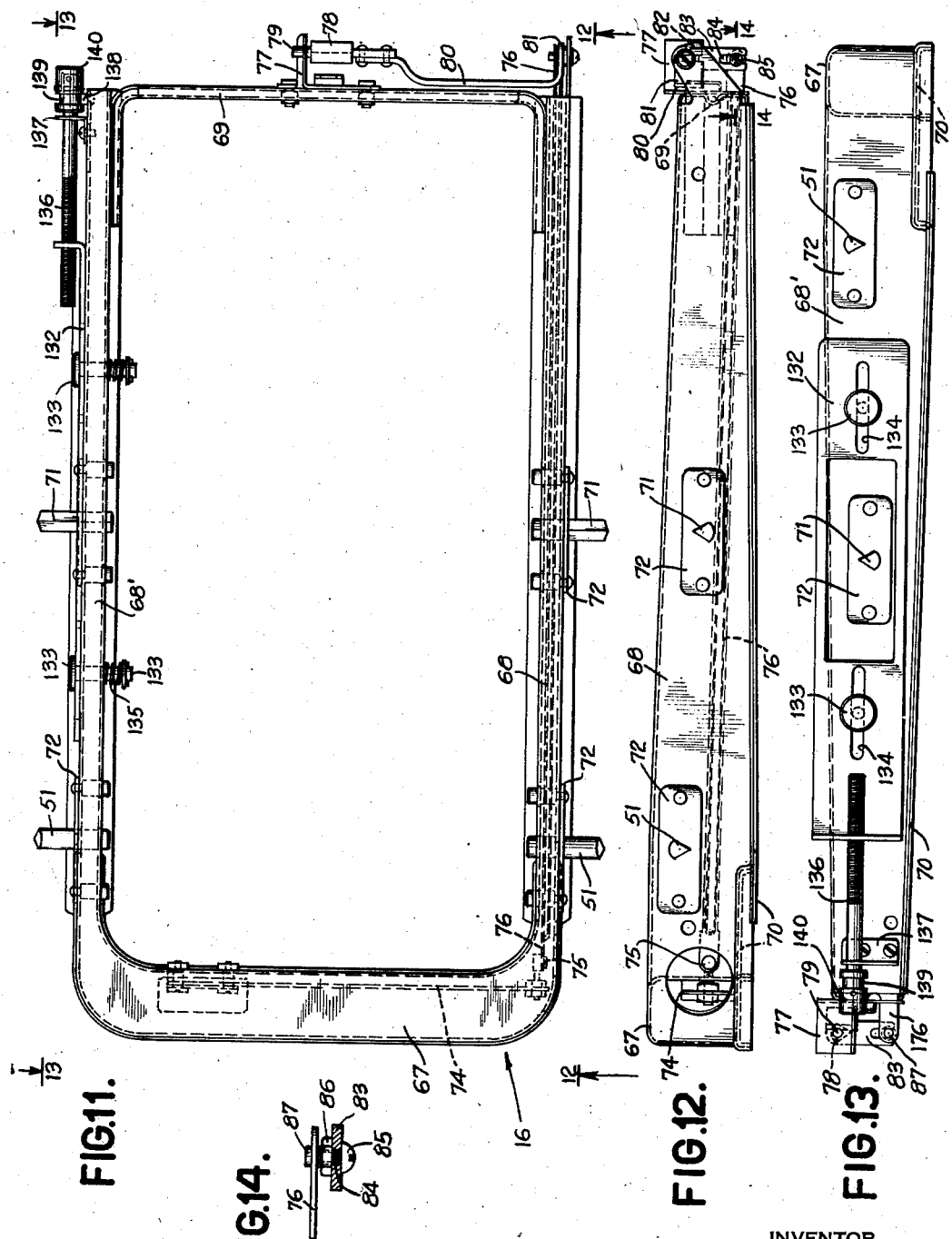

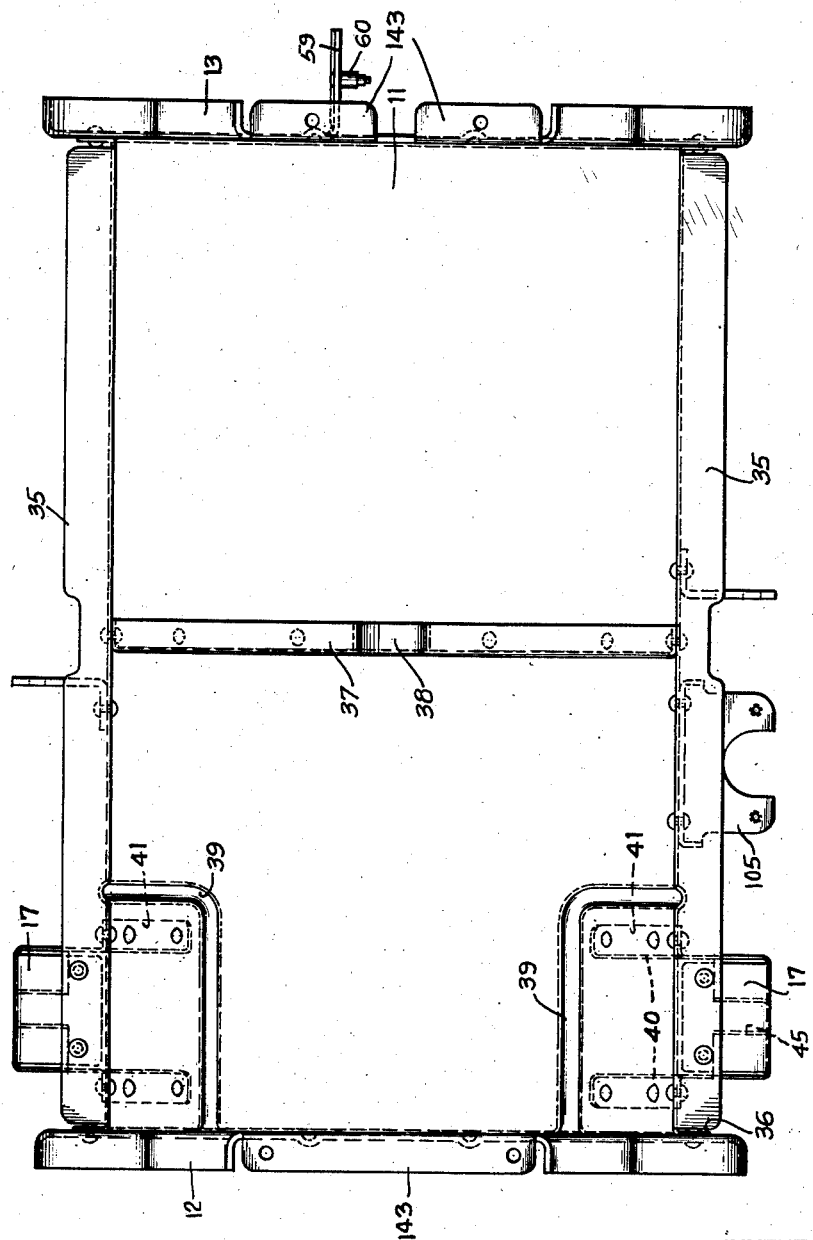

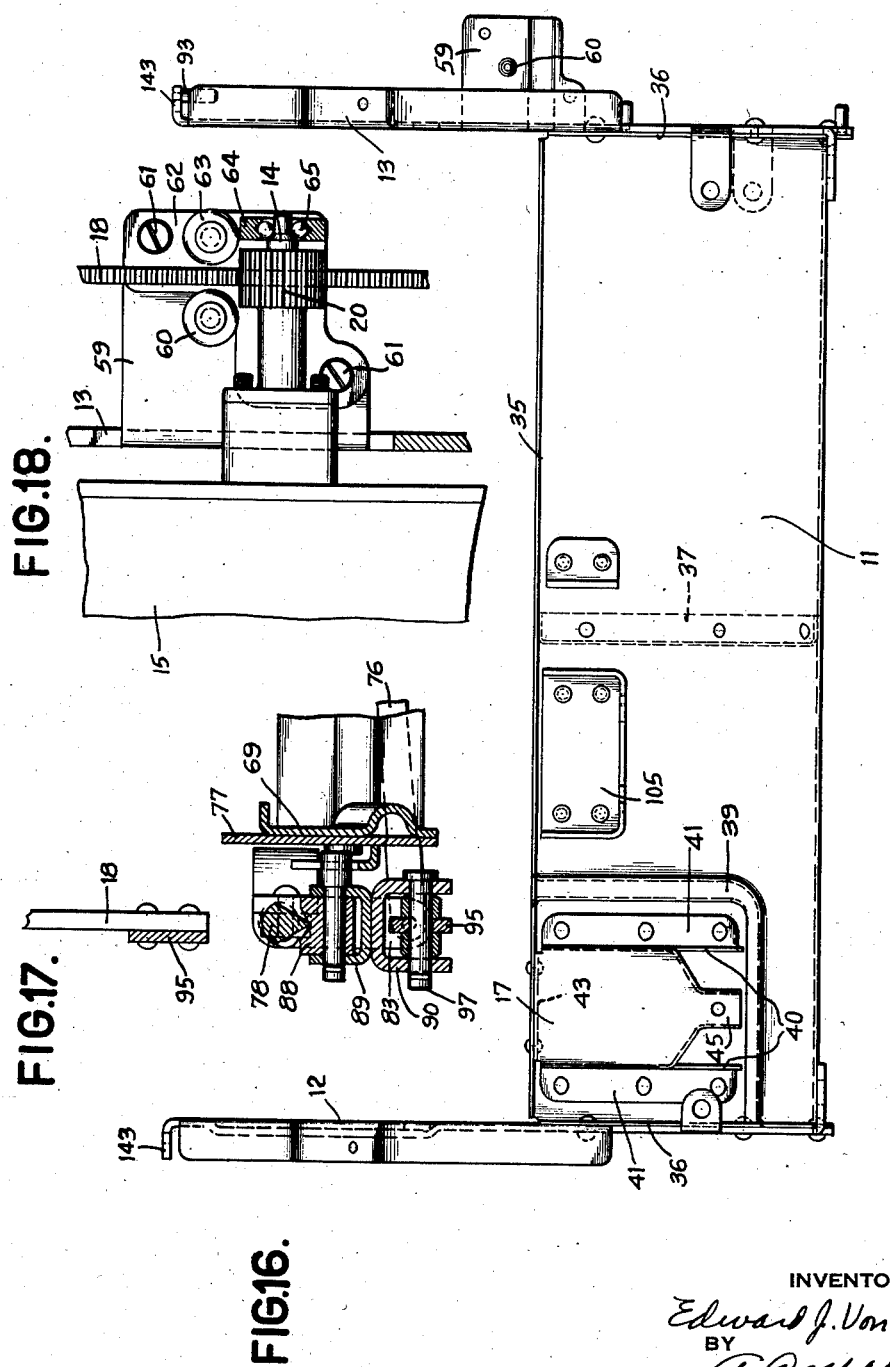

Dec. 8, 1936.　　　　E. J. VON PEIN　　　　2,063,712
SCALE
Filed Dec. 30, 1933　　　9 Sheets-Sheet 9
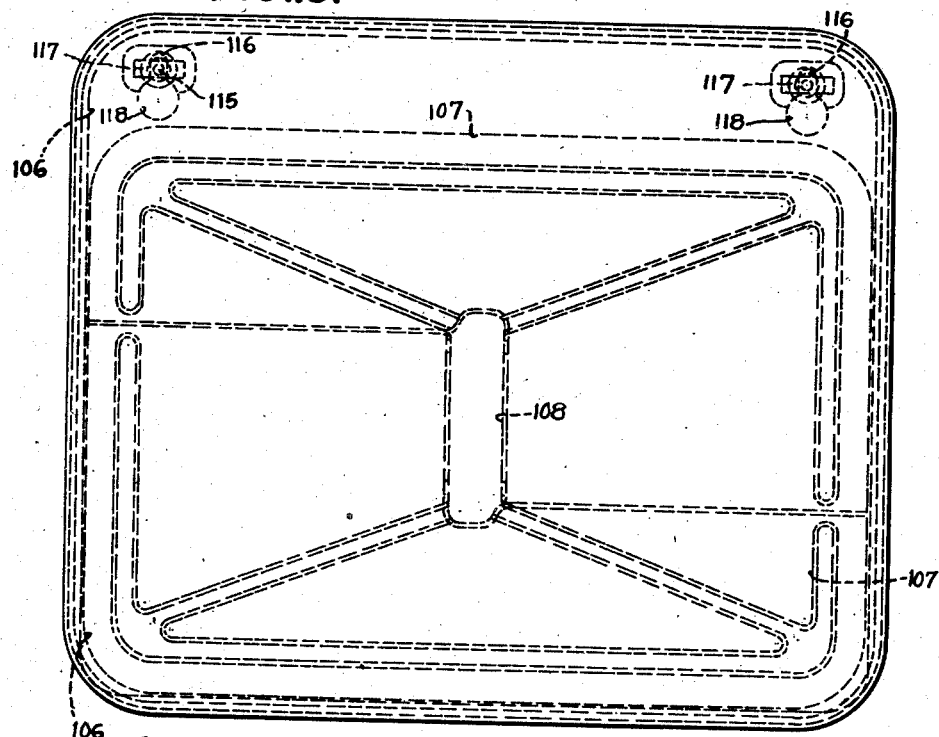
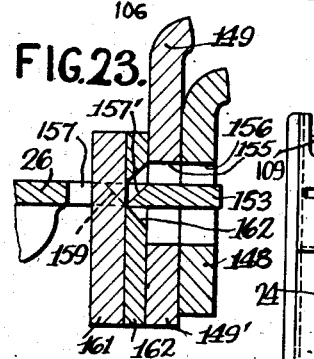
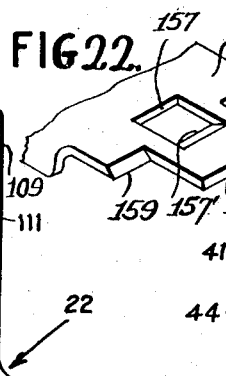
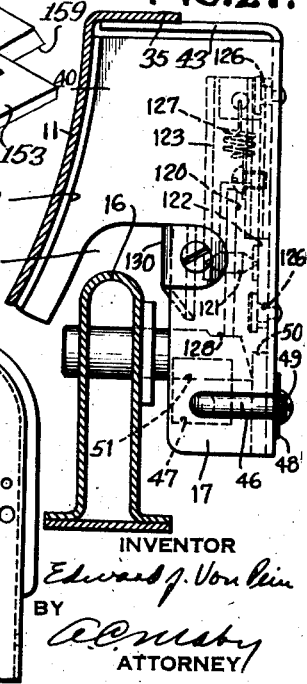
INVENTOR
Edward J. Von Pein
BY
ATTORNEY Patented Dec. 8, 1936

2,063,712

UNITED STATES PATENT OFFICE 2,063,712

SCALE

Edward J. Von Pein, Endicott, N. Y., assignor, by mesne assignments, to The Hobart Manufacturing Company, Troy, Ohio, a corporation of Ohio Application December 30, 1933, Serial No. 704,782

18 Claims. (Cl. 265—39)

This case relates to counter scales or scales of the type used in retail stores to furnish the weight and price of an article.

In general, the object is to devise a scale having its parts constructed and arranged with the utmost compactness without thereby limiting the dimensions of the platform or the weight and price ranges of the scale.

More specifically the object is to provide a scale in which the objective of compactness is attained by a cocoon-like or telescoping arrangement of parts.

The latter object also includes the provision of a simple built-up inner chassis which is shaped to conform to the contour of the drum chart and to closely surround the chart.

A further object is to provide a novel inner chassis for supporting scale parts.

The object is also to provide a scale having the platform above a drum chart with multiplying lever connections between the platform, counterbalancing means, and the chart all arranged substantially within the plan projection of the platform.

Other objects are to improve the check link construction, the bearing means for the drum chart, the zeroizing adjustment for the scale, the platform structure, and the platform support, while still other objects will be made apparent from the description following and from the drawings, in which:

Fig. 9 is a view of the left end of the chassis.

Fig. 10 is a view of the right end of the chassis.

Fig. 11 is a plan view of the base lever.

Fig. 12 is a view along line 12—12 of Fig. 11.

Fig. 13 is a view along line 13—13 of Fig. 11.

Fig. 14 is a section on line 14—14 of Fig. 12.

Fig. 15 is a plan view of the chassis.

Fig. 16 is a side view of the chassis.

Fig. 17 is a section on line 17—17 of Fig. 4.

Fig. 18 is an enlarged detail of the driving and bearing means for the left hand end of the chart shaft.

Fig. 19 is a plan view of the platform.

Fig. 20 is a side detail view of the platform support.

Fig. 21 is an enlarged detail end view of the fulcrum support and hold-down means.

Fig. 22 is a fragmentary view in perspective of an end of the check link, and Fig. 23 is an enlarged fragmentary view of a portion of Fig. 7 illustrating the parts in greater detail.

Figure 1:
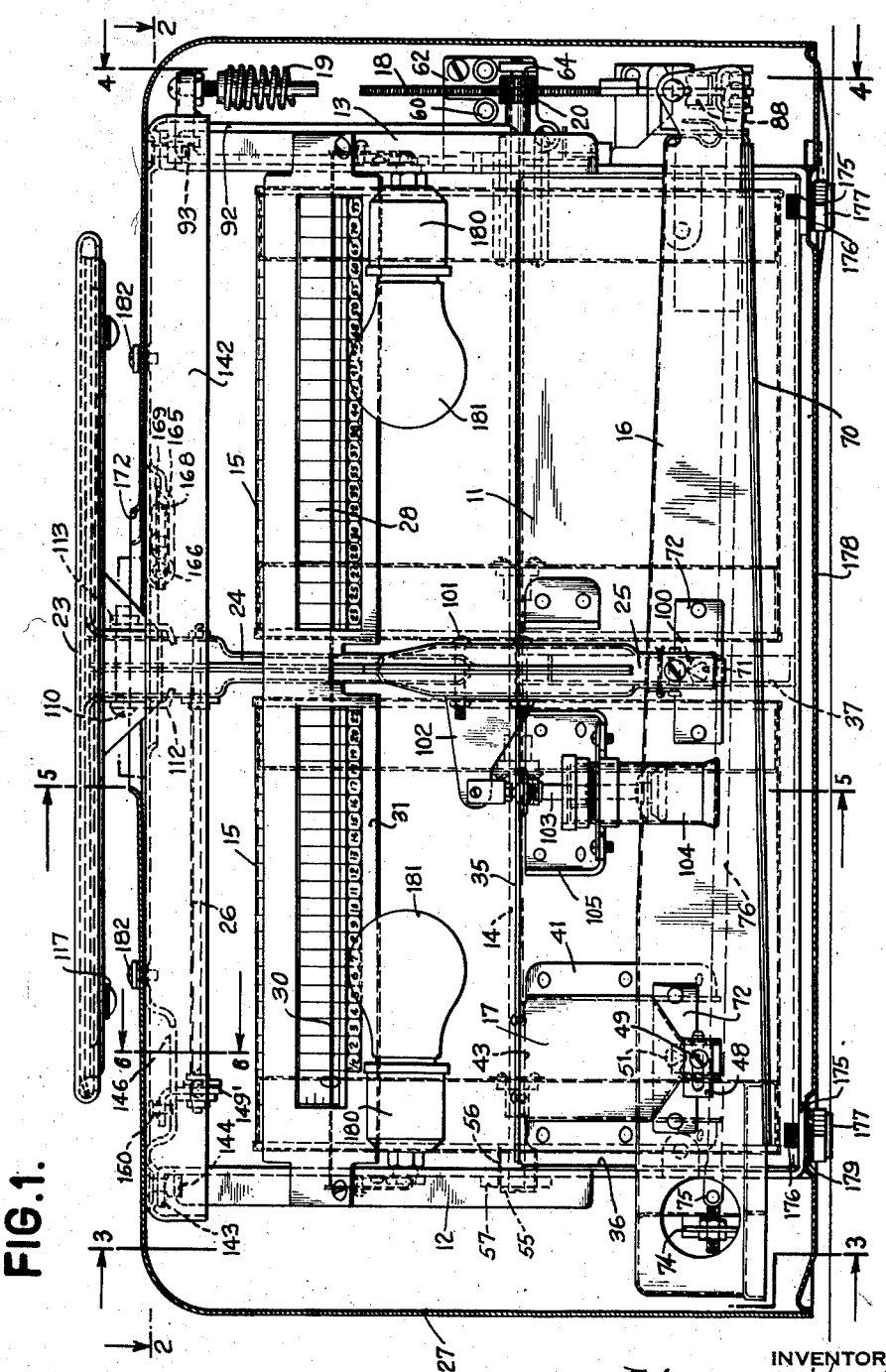
Fig. 1 is a front view from the merchant's side with the outer case in section.

The scale will first be generally described.

It comprises an inner chassis including a horizontally disposed semi-cylindrical shell 11 (see Figs. 5, 9, 10, and 16) supported at opposite ends by attached vertical end plates 12 and 13 adapted to stand upright on a supporting surface. Between the end plates is journaled horizontal shaft 14 of a drum chart made up of two, spaced, cylindrical sections 15 of equal width. Each section bears circumferential weight and value columns, with the value columns based on different unit prices. The arcuate contour of shell 11 is concentric with respect to the chart periphery. Accordingly, the lower half of the chart lies within the shell 11 and is closely surrounded thereby, with a minimum of clearance.

Closely encompassing the chassis is a rectangular, open, lever 16 (see Figs. 2 and 11) the longitudinal axis of which is generally parallel to the axis of the chart. The lever lies below the upper end of the shell 11 and is fulcrumed on brackets 17 (see Figs. 3, 8, and 21) rigidly hung from opposite sides of the shell. One end of the lever extends just beyond the right hand end plate 13 and is there connected to rack 18 and counterbalancing springs 19 (see Figs. 1, 4, and 18). Rack 18 meshes with pinion 20 on one end of shaft 14 to drive the drum chart.

Lever 16 is of the third order and carries the platform support 22 for platform 23. The platform support is of generally inverted Y-shape (see Figs. 5 and 20), vertically disposed in a plane passing between the chart sections 15, and having its upper portions entering the space between the chart sections. The stem 24 of the support 22 carries the platform at its upper end while the legs 25 of the support diverge to straddle the chart shaft 14 and the long sides of the lever 16 and rest at their lower ends on pivots carried by said lever sides. Legs 25 being wide apart and engaging the lever at widely spaced points, the platform support is extremely stable against tilting in a direction transverse to the longitudinal axis of the lever although the width of stem 24 is equal to only a narrow horizontal chord of the upper portion of the chart for a reason which will be made evident later.

To prevent tilting of the platform structure in the direction of the longitudinal axis of lever 16, a check lever 26 (see Figs. 1, 2, 5, 6, and 7) connects the stem 24 to the chassis.

Enclosing the chassis and the weighing parts carried thereby, except the platform, is an outer case 27 removably secured to the chassis. The upper portions of the casing sides slope and converge towards the platform, lying for the most part directly beneath the platform. This brings the sloping portions close to the periphery of the chart. It may now be understood why stem 24 of the platform support 22 is made narrow. By so doing, the platform support forms no obstacle to the location of the sloping portions of the casing as close as possible and as desired to the parts of the chart periphery from which readings are to be taken. In the sloping portion close to the chart periphery at the merchant's side is provided a cylinder lens 28 underlying the platform and having its principal axis inclined upward radially of the chart in line with the inclined sighting plane of an observer of average height looking down at the scale from above the level of the platform. Thus, although the platform is so wide as to extend beyond the opposite peripheral sides of the chart, and therefore overlie the chart at its reading line, the slope of the housing and the sight lens above the reading line of the chart permits an observer looking down from above the level of the platform to read the chart at a point underneath the platform. The sloping portion of the casing 27 at the customer's side contains a narrow sight window 29 for exposing a column of weight figures of the chart to the customer. The advantages of the sloping portion of the casing at the customer's side are similar to those for the merchant's side of the scale.

Secured to the end plates 12 and 13 are sight lines 30 for the chart and a plate 31 marked with the unit prices alined with their respective value columns of the chart sections 15.

The above brief description brings out the following characteristics of the scale.

1. The scale has a cocoon-like arrangement of one part lying within another; thus the chart lies within the similarly curved chassis shell which below its widest portion is encompassed by a base lever, which is straddled by a platform support, and the whole enclosed by the outer case 27. By reason of this arrangement, the scale is as compact as possible and has a minimum height, width, and length for a given indicating capacity.

2. The platform is located directly above the center of the drum chart and therefore may be large without extending beyond the ends of the chart and scale. This is accomplished without sacrificing the advantages of a multiplying base lever between the platform and the counterbalance and between the platform and the chart driving means.

3. While the platform is above the center of the split drum chart, the counterbalance and the rack drive are beyond one end of the chart where there is more room than between the drum sections and where they are more accessible for assembly, removal, and adjustment.

4. The platform support is similar to a triangular truss having its base bearing on the lever therefore forming a very stable supporting structure against transverse tilting of the platform and narrowing towards the upper end to permit the upper portions of the outer case to converge and slope to points underneath the platform and to lie close to the chart periphery.

5. The sloping upper portions of the outer casing sides permit the employment of a platform wider than the chart and the main portion of the casing without interfering with the proper exposure and view of the chart to an ordinary observer.

The general plan or scheme of the scale having been given, the detail means for carrying out the plan will now be described.

Shell 11 of the chassis (see particularly Figs. 5, 9, 10, 15, and 16) is of sheet metal, stamped to shape, with its longitudinal edges bent to provide horizontal flanges 35 and its semi-circular ends bent to provide vertically disposed end flanges 36.

To stiffen the shell, chiefly against lateral stresses, a dished semi-circular plate 37 is set into the shell mid-way of its ends and riveted thereto in a position to lie between the spaced drum chart sections 15 when the scale is assembled. The upper, diametrical, end of the plate is formed at its center with a rounded depression 38 to form a passage for shaft 14 of the drum chart.

It is desirable to make the left hand corners of shell 11 of greater strength than the rest of the shell because the base lever 16 is supported at these corners, which therefore directly bear the weight of the lever and the parts carried thereby. To strengthen these corners, they are marked off from the rest of the shell by right angular ribs 39 which stiffen the shell at the corners against longitudinal and lateral stresses approximately to the same extent as though the shell, in place of the ribs, were formed of solid metal of the same thickness as the depth of the ribs.

The fulcrum brackets 17 are firmly supported by the shell at these left hand corners. The brackets are of sheet metal, stamped to a general U-shape, with the legs 40 terminating at their outer ends in arcuate flanges 41 conforming in shape to the sides of the shell 11 to which they are riveted. The back of the bracket is flanged over at the top to provide a horizontal flange 43 to set against the lower surface of flange 35 and be riveted thereto.

The brackets thus virtually become solidly supported, integral parts of the shell 11. Legs 40 of the brackets are cut out to form passages 44 to accommodate the long sides of lever 16 which pass therethrough. In this manner, the width of the levers is less than if the sides thereof were required to pass on the outside of the brackets. The legs 40 and the back of the bracket are narrowed at their lower ends to form a reduced U-shaped channel 45, between the sides of which is pivoted the angle pin 46 (see Figs. 8 and 21) on which is swiveled the fulcrum block 47. The pin 46 is bent at right angles to be fixed into a plate 48 secured to the base of the channel 45 by a screw 49 (see Fig. 1) which is also threaded into thrust plate 50 inside the channel. Plate 50 engages the end of fulcrum knife edge 51 extending from lever 16.

Riveted to end flanges 36 of the shell 11 are the stamped, dished, end plates 12 and 13. The lower horizontal, flat edges 54 (see Figs. 9 and 10), of the end plates extend below the bottom of shell 11 and support the chassis in upright position on a convenient surface during the assembly of parts on the chassis.

End plate 12 being close to the reinforced left hand corners of the shell which carry the fulcrum brackets 17 increases the rigidity of these corners and their resistance to deflection under the weight of the lever 16 and its parts.

Figure 2:
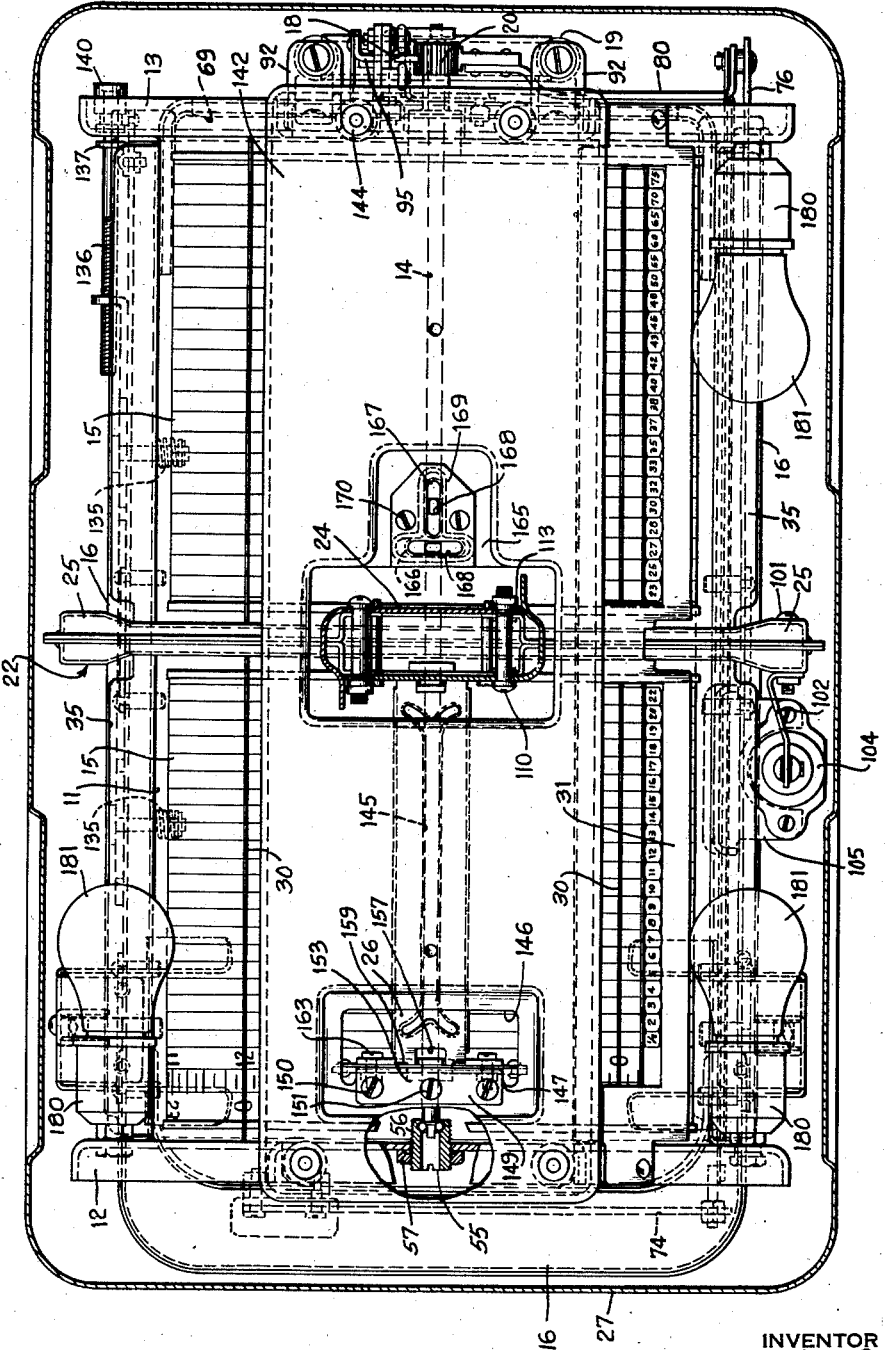
Fig. 2 is a plan section along line 2—2 of Fig. 1.

End plate 12 also carries the ball bearing 55 for the left end of the shaft 14 (see Figs. 1 and 2). The ball bearing cage 56 is threaded into a tapped hole in the plate 12 and held in adjustable position by a nut 57. By adjustment of the bearing 55, the entire chart assembly is shifted axially into its proper position.

End plate 13 has a vertical slot 58 open at the top, the purpose of which is to permit the shaft 14 carrying the chart sections 15 and pinion 20 to be assembled to the chassis by first inserting the right hand end of the shaft into the slot 58 and then when at the bottom of the slot shifting the shaft towards the left into cooperation with the left bearing 55. This enables the use of a chart having a length such that its ends are extremely close to the end plates although its shaft 14 necessarily extends beyond the end plates to be mounted therein and to be driven by rack 18. It further enables the chart to be removed and replaced without requiring removal of the left bearing 55 and readjustment of the latter.

In punching out slot 58, the metal at the lower end of the slot is cut only at one side and is then bent over at right angles to the plane of the plate 13 to form an ear 59. This ear rotatably mounts a guide roller 60 for rack 18. Also fastened to the ear by screws 61 is a bracket 62 (see Figs. 1, 4, and 18) which journals the companion guide roller 63 of rack 18. The outer end of the bracket 62 is bent at right angles to the ear 59 to form a lug 64, the tip of which is hardened and formed as a ball bearing 65 for the right hand end of shaft 14.

By the use of the removable bracket 62, the shaft 14 may be slipped into position in the chassis through the slot 58 in end plate 13 before the bracket is put on, and then the bracket moved in a direction axial of the shaft to be secured to ear 59 with bearing 65 engaging the right end of the shaft 14. This permits the chart to be substantially as long as the chassis and yet have its shaft supported by a bearing which does not require a separate standard or upright but is carried by the end plate 13 itself. A further purpose of the removable bracket 62 and the mounting of only one guide roller 60 on the chassis plate 13 is that the bracket 62 and its parts may be secured to the end plate 13 while rack 18 is in mesh with pinion 20.

Thus, should it be necessary to replace the chart after the scale mechanism including the rack is in place on the chassis, all that needs to be done is to remove the bracket 62, slip the chart and its shaft off the end plates, and then insert a new chart, and replace the bracket 62.

A still further advantage in the use of the removable bracket 62 over the formation of a bracket integral with the end plate 13 is that the bearing portion of the bracket may be hardened and machined with far greater facility than if it were integral with the end plate.

Referring particularly to Figs. 11 to 14, lever 16 is in the form of an open rectangle encompassing the shell 11 and end plates 12 and 13 of the chassis. The longitudinal axis, i. e. the axis of the lever at right angles to its rocking axis, extends in the same direction as the axis of the drum chart and the longitudinal axis of the semicylindrical shell 11. The rear side 67 and the two long sides 68 and 68' of the lever are the base and legs, respectively, of a continuously channeled U-shaped member. The fourth and front side 69 of the lever is the base of a stamped U-shaped bar welded at its sides to the long sides 68 and 68'. Also welded to the bottom of sides 67, 68, and 68' are reinforcing plates 70.

Fulcrum knife edges 51 of the lever and load knife edges 71 extend from the opposite long sides 68 and 68' of the lever. The knife edges are rigidly and non-adjustably carried by plates 72 riveted to the lever sides.

As counterbalancing springs 19 vary in temper and resistant strength with changes in temperature, compensation therefor is provided by a thermostatic device to vary the effective lever arm of the springs on lever 16. This device, in the present case, comprises a thermostat metal bar 74 housed inside the closed channel of the rear side 67 of the lever 16. The bar 74 is clamped at one end to the side 67 and its other end extends in line with the closed channel in the long side 68 of the lever. The movable end of bar 74 is pivotally connected at 75 to a link 76 housed within the channel of the long side 68 of the lever and passing therethrough to project a short distance past the front of the lever. Also projecting forwardly past the front of the lever is an extension of lever side 68. Parallel to this extension is a bracket 77 fastened to the front of side 69 of the lever. One end of the nose iron knife edge 78 is formed with a trunnion 79 eccentric to the bearing line of the knife edge. The trunnion is journaled in bracket 77. The other end of nose iron 78 is fastened to a horizontal plate 80 forming an integral right angularly bent part of the short arm 81 of a bell crank lever 82 pivoted in line with trunnion 79, in the forward extension of lever side 68. The longer arm 83 of lever 82 is formed with a vertical slot 84 through which freely passes the body of a screw 85 threaded into a nut 86 having a smooth round terminal portion 87 seated in a hole in the front end of link 76. The screw 85 may be loosened and the front end of link 76 moved along slot 84 to vary the effective lever arm of link 76 on bell crank lever 82. When the proper ratio between the arms of the lever 82 is obtained, the screw 85 is turned to firmly clamp the opposite sides of lever arm 83 between nut 86 and the head of the screw.

Due to temperature changes, the free end of thermostat bar 74 will move substantially lengthwise of the lever, transmitting this motion through link 76 to the bell crank lever 82 to rock the nose iron 78, thereby shifting the position of the bearing line of the nose iron longitudinally of the lever. The distance the nose iron is shifted depends on the ratio of arms 81 and 83 of the bell crank lever and by adjusting the forward end of link 76 along arm 83, in the manner described above, the ratio will be changed to provide the necessary movement of the nose iron knife edge. The moment arm of the springs 19 on the base lever 16 will thus be automatically varied with temperature changes.

Figure 4:
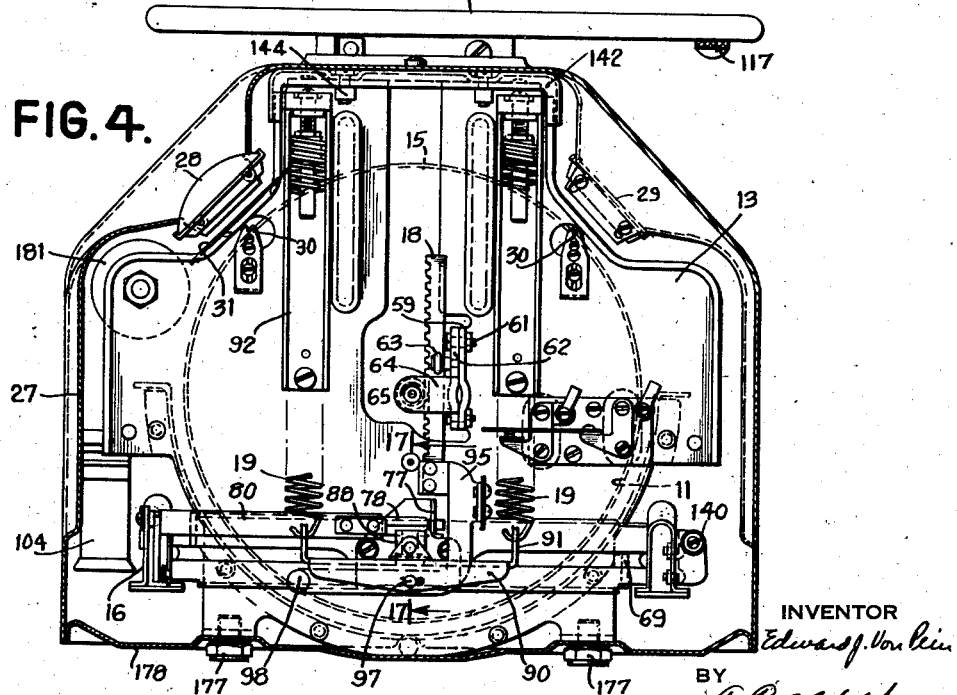
Fig. 4 is a section along line 4—4 of Fig. 1.
Figure 5:
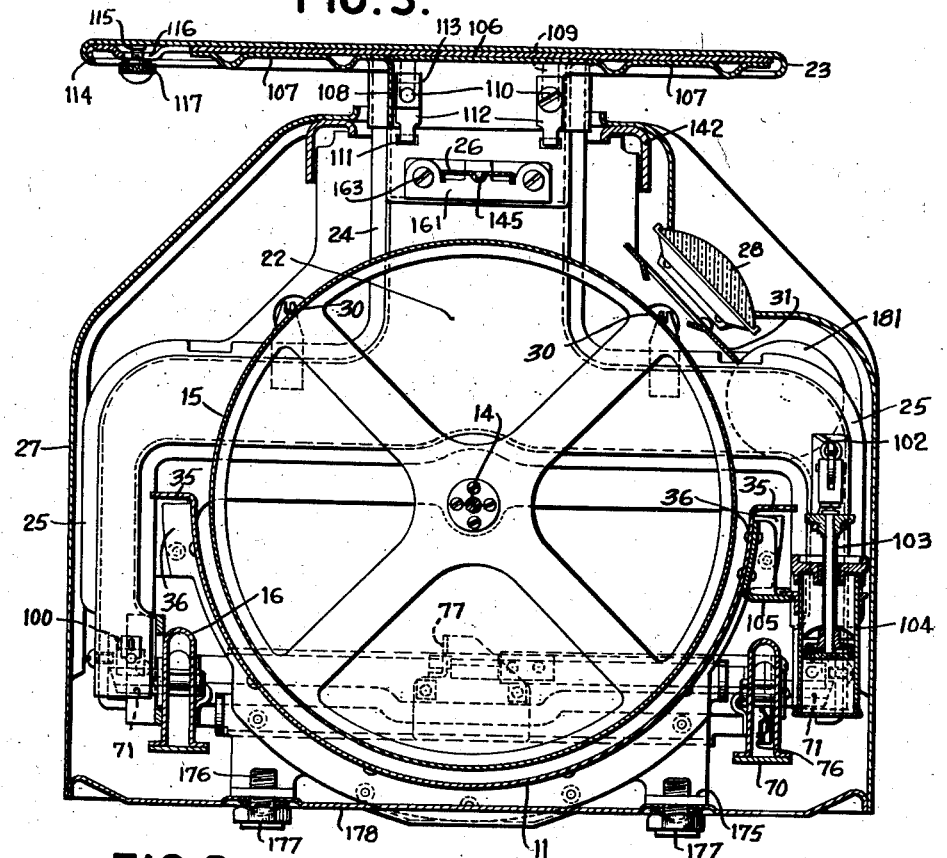
Fig. 5 is a section along line 5—5 of Fig. 1.

Referring particularly to Figs. 4 and 17, the connection between the lever 16 and the springs 19 is effected through the nose iron 78 supported on a bearing block 88 swiveled between the sides of a U-shaped clip 89 fast to the top of a channeled equalizer bar 90. Bar 90 has lugs 91 at opposite ends to connect with the lower ends of the springs 19. The upper ends of the springs are mounted to thermostatic metal strips 92, rigidly secured at the lower ends to the end plate 13 of the chassis and slidably, loosely, guided at their upper ends by vertical pins 93 (see Figs. 1 and 10) carried by the end plate 13. The strips 92 are thus free to move vertically due to temperature changes to thereby lengthen or shorten the springs 19 for maintaining the parts of the scale in zero position irrespective of temperature changes.

Rack 18 for driving pinion 20 on the chart shaft 14 is carried by a rack foot 95 which passes through a hole in the top of the channeled equalizer bar 90 and is swiveled in the channel on a pin 97 supported between the sides of the equalizer channel. To bias the rack 18 towards the pinion, the outer, free, end of the rack foot 95 is provided with a weight 98.

By supporting the rack 18 in the same general plane as the equalizer, the motion of the rack is more truly vertical than if it were connected to the lever beyond the equalizer bar. Further, the arrangement requires less space in a longitudinal direction than if the equalizer bar and rack were in separate vertical planes.

Referring particularly to Figs. 1, 2, 5, and 20, the load knife edges 71 of the lever 16 carry the inverted Y-shaped platform support 22. The support is of sheet metal and formed of two vertical half-shells, symmetrically disposed with respect to a central vertical plane through support 22. The half shells are provided with flanges which when welded to each other produce a virtually integral, hollow member with a four-sided cross-section (see Fig. 2) providing for a maximum rigidity for a minimum weight of metal. Legs 25 of support 22 straddle the long sides 68 and 68' of the lever 16. The lower ends of the legs open towards the lever to receive the load knife edges 71 of the lever on which rest the bearing blocks 100 pivotally mounted between the sides of the lower ends of legs 25.

Fastened to one of legs 25 by bolts 101 (see Figs. 1 and 2) is an angle bracket 102 from the outer end of which is pivotally suspended the plunger 103 of the dash pot 104. The dash pot is mounted on a bracket 105 with an arcuate base riveted to the side of shell 11.

The platform assembly is mounted on top of stem 24 of the platform support and comprises a spider consisting of a substantially flat plate 106 (see particularly Figs. 5 and 19) to the bottom of which are welded similar, complemental, brackets 107. The brackets 107 are stamped to shape out of sheet metal, each with a pair of depending adjacent angular walls to which the angular depending walls of the other bracket form a counterpart so that when both brackets are fixed to plate 106, the pairs of depending walls complement each other to form a single, depending, substantially rectangular socket 108. The socket 108 non-rotatably fits over the similarly shaped upper end of stem 24 of support 22. The upper end of stem 24 has vertical slots 109 open at the top to receive bolts 110 which pass through alined holes in opposite walls of socket 108. Below the bottom of slots 109, the stem 24 has oblong slots 111 to receive the downwardly bent ends of clips 112 (see Figs. 1 and 5) carried by the bolts 110 outside the opposite walls of the socket 108. When nuts 113 are tightened on the bolts, the bent ends of the clips wedgingly coact with the oblong slits 111 to firmly force the platform spider plate 106 down into engagement with the upper edges of the stem 24.

Platform 23 is carried on spider plate 106 and has a downwardly and inwardly curled rim to form a reentrant channel 114. Plate 106 and platform 23 are rectangular but plate 106 is slightly shorter in one direction to permit movement of the platform along the plate 106 in said direction, and to enable the corners of plate 106 to move into the channel 114 of the platform. To secure the platform to the plate in this position, screws 115 welded to the bottom of the platform pass through slots 116 in the plate 106 and carry knurled nuts 117 which are turned to clamp the platform to the plate. To prevent the screws from being misplaced, they are permanently retained on the screws by upsetting the ends of the screws. Slots 116 communicate with round holes 118 in plate 106 which are larger than nuts 117.

To remove the platform, the nuts 117 are loosened and the platform moved in the direction of the slots to release the channel 114 from the edges of the plate 106 and to locate the nuts 117 in line with holes 118. The platform is then free to be lifted off the plate 106.

The entire platform assembly is readily removed from stem 24 by loosening the bolts 110 until clips 112 disengage slits 111, leaving the platform assembly free to be lifted off stem 24.

When load is placed to one extreme side of platform 23, the division of load transmitted by the platform support to one long side of lever 16 is greater than that transmitted to the other long side. The lever therefore has a tendency to tilt transversely about the connection of its nose iron 78 to the equalizer 90 as an axis, tending to raise one fulcrum knife edge 51 of the lever off its bearing. To prevent this, means are provided to constantly hold the knife edges firmly to their bearing blocks 47.

Figure 3:
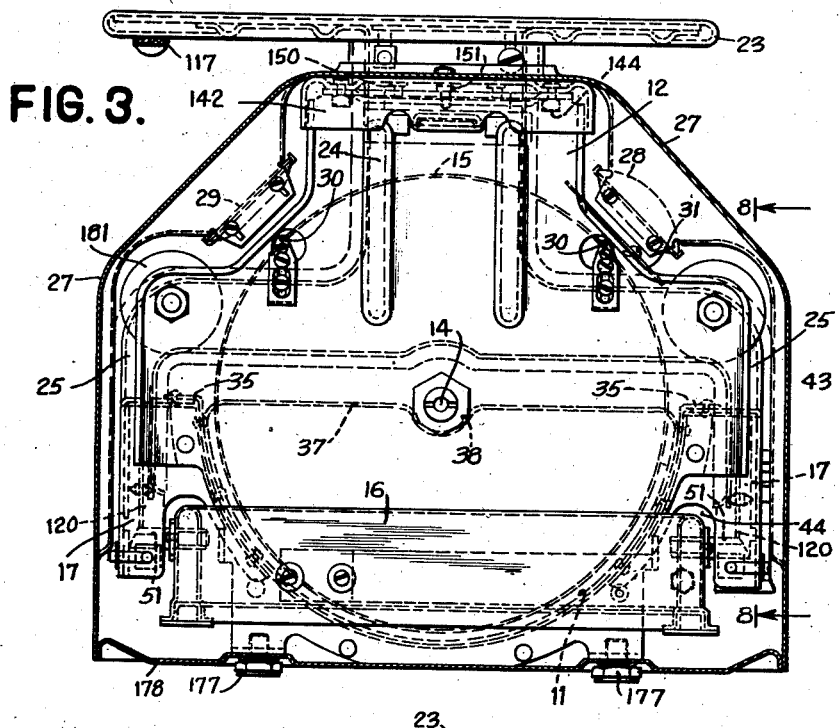
Fig. 3 is a section along line 3—3 of Fig. 1.
Figure 8:
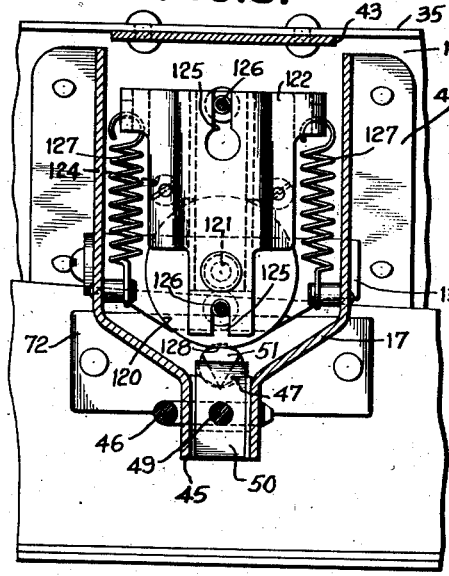
Fig. 8 is a section along line 8—8 of Fig. 3.
Figure 6:
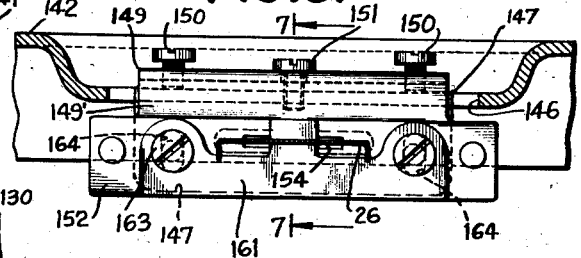
Fig. 6 is a section along line 6—6 of Fig. 1.
Figure 7:
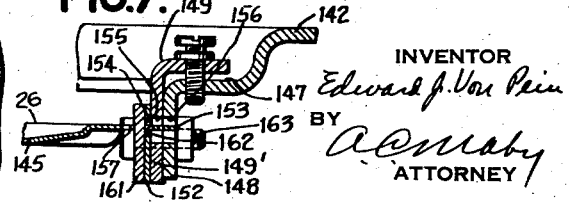
Fig. 7 is a section along line 7—7 of Fig. 6.

Referring particularly to Figs. 3, 8, and 21, these means are housed entirely in the interior of fulcrum brackets 17 and include rollers 120, one for each fulcrum pivot 51. The shaft 121 of each roller has pointed ends to coact with conical depressions in plates 122 and 123 for providing a very efficient rotary bearing for the roller. Plates 122 and 123 are rigidly secured to each other by screws 124 and plate 122 has vertical slots 125 to coact with guide pins 126 fastened in the base of bracket 17. The guide pins mount the plates and roller for vertical slidable movement and coil springs 127 secured between the plates and the bracket 17 urge the roller 120 downwardly into contact with the rounded surface 128 formed at the end of the pivot 51.

The roller is vertically movable instead of fixed in location for the following reasons. First, if, as by someone violently striking the platform at one side, a fulcrum pivot 51 is urged upwardly with more than ordinary force to rise from its bearings, the springs 127 will yield to permit roller 120 to rise, thereby preventing breaking of either the knife edge or the roller. The pivot 51 will then move upwardly till it encounters the plate 130 fastened to the bracket 17.

Second, as the knife edge of pivot 51 wears or as the roller wears, the springs 127 will act to take up wear in the parts and constantly maintain the roller in contact with the pivot.

Third, if the periphery of the roller is not perfectly true, the springs will still hold the roller firmly engaged with the pivot.

When the pivot rocks under a load applied to the lever, the surface 128 tends to frictionally rotate the roller. The diameter of the roller is made as large as possible to cause it to turn freely under the very small turning forces exerted by surface 128. This fact taken with the fine point bearing of the roller shaft 121 reduces to a bare minimum the resistance of the roller 120 to rocking of the pivots during a weighing operation.

Further, the roller and surface 128 engage at a point in a line joining their centers, so that the force of the springs 127 transmitted through the roller is directed radially against surface 128, thus avoiding any possibility of any camming action between the roller and the pivot which may tend to turn the pivot.

Referring particularly to Figs. 11 and 13, to provide a zero adjustment for the scale mechanism, lever 16 carries a weight in the form of a bar 132 slidably mounted to long side 68' of the lever by guide studs 133 passing through longitudinal slots 134 in the bar. The studs pass through holes in the side 68' and are pressed by springs 135 to frictionally engage the surface of bar 132 to prevent any tendency of the bar to creep along the lever. The forward end of the bar is bent transversely and threaded to receive a screw 136 journaled in bracket 137 secured to the side 68'. The screw 136 is fixed against longitudinal movement by a stud 138 extending from side 68' into a groove 139 in the screw.

The head 140 of the screw is adapted to be engaged by a screw driver for turning the screw to shift the bar 132 longitudinally of the lever and thereby adjust the zero position of the weighing mechanism.

To stiffen the chassis and brace it, particularly at the upper end, against lateral and longitudinal stresses, an oblong cap 142 is provided for the upper end of the chassis. The cap 142 comprises a dished sheet metal plate flanged downwardly on all sides. After the drum chart is inserted in the chassis, the cap 142 may be secured to the top, horizontal flanges 143 of the end plates 12 and 13 by means of bolts 144. The chassis is now complete and is braced against stresses in all directions substantially in the same manner and to the same degree as a hollow beam with closed ends.

The details of the connections of check link 26 to the frame and the platform stem will now be explained with reference to Figs. 1, 2, 5, 6, and 7.

The check link is formed of sheet metal with a rib 145 extending longitudinally along the check link and transversely branched at its ends. By means of this rib, the check link, in effect, is substantially as rigid as a solid bar having a thickness equal to the depth of the ribs. One end of the check link is connected to cap 142 of the frame. For this purpose, cap 142 is formed with a rectangular, inset or depressed hole 146, having horizontal margins, of which one, 147, is bent vertically downward to form a depending, vertical, flange 148. Margin or ledge 147 carries an angle bracket 149, the vertical portion 149' of which passes downwardly through hole 146 to be positioned generally parallel to flange 148.

The bracket 149 is secured to ledge 147 by means of two screws 150 and a screw 151 located between screws 150. Screws 150 are threaded into the top of bracket 149 and abut the top of ledge 147 while screw 151 passes freely through the top of bracket 149 and is threaded into the ledge. Both screws 150 and 151 must be turned to shift the bracket 149 vertically to locate the fulcrumed end of the check link at the height required to give the proper parallelogram action in conjunction with base lever 16. Thus to lower the bracket, the screws 150 must be raised and then screw 151 turned down. When the bracket is sufficiently lowered, screws 150 are turned down to abut the ledge 147 and thereby lock the bracket in position.

The fulcrum of the check link is formed as follows: To the face of vertical portion 149' of the bracket is riveted an end thrust plate 152. The end of check link 26 is reduced in width to form a tongue 153 passing through horizontally extending narrow slit 154 in plate 152 formed with inclined walls and loosely through wider and alined slots 155 and 156, respectively, in bracket portion 149' and flange 148. In rear of tongue 153, the check link is formed with a hole 157, the front edge of which is in the form of a knife edge 157' alined with knife edged shoulders 159 at each side of the tongue.

In making the check link, stiffening rib 145, holes 157, tongues 153, and the knife edged front of hole 157 and the knife edges 159 are all die shaped and punched in the same operation. The portions of thrust plate 152 at opposite sides of slit 154 engage the knife edges 159. Passing through hole plate 157 is another end thrust 161 for engaging the front knife edge of hole 157. The knife edges of the check link are in line with the sharp edge 162 of slit 154 which engages the bottom of tongue 153. In this manner, a sharp, two-way, thrust bearing is provided for one end of the check link which at the same time forms a sharply defined line fulcrum for the check link.

Smooth portions of screws 163 pass freely though without play, through alined holes in thrust plate 161 and the flange 148 and through vertically elongated and alined slots 164 in the bracket portion 149' and thrust plate 152. The screws 163 thus serve as guide pins coacting with slots 164 for guiding vertical adjustment of the bracket 149 and the end of the check link connected thereto. Due to hole 146 being formed in a depression in cap 142, bracket 149 and screws 150 and 151 may lie below the top of outer casing 27.

The right end of the check link is connected to the stem 24 of the platform support in a manner similar to the left end but without provision for vertical adjustment.

Cap 142 is also formed in the stamping operation with a depression 165 (see Figs. 1 and 2) having two narrow grooves 166 and 167 in the base of the depression at right angles to each other in which are laid the glass vials 168 containing the spirit levels. The levels are retained in the recesses by a plate 169 fastened by screws 170 to the cap 142. Upon removing the platform assembly from platform support 22, the levels are visible through opening 172 in the casing 27. By being set inside a recess 165, there is no danger that the casing 27 when being placed in position will break the glass vials 168.

End plates 12 and 13, at their lower ends are formed with horizontally bent lugs 175 threadedly receiving screws 176, the heads 177 of which form the leveling feet of the scale. A bottom plate 178 encloses the scale at the bottom and is fastened in place by the leveling screws 176 with spring washers 179 located between the heads of the screws and the bottom plate to take up slack.

The sockets 180 for illuminating lamps 181 are fastened directly to the sides of end plates 12 and 13 projecting transversely past the drum chart. The lamp circuit may be controlled in any suitable way.

Outer casing 27 is secured to the cap 142 by screws 182.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A scale comprising a load platform, a drum chart horizontally disposed directly underneath the platform and formed in separated drum sections, a hollow inner chassis encompassing the chart, and having vertically disposed end closures for journaling the chart between them, counterbalancing means vertically disposed directly opposite to and exterior to one of the end closures and supported thereby, a base lever below the middle of the chart with its longitudinal axis disposed generally parallel to the axis of rotation of the chart, operating connections between one end of the base lever and said counterbalancing means, means also connected to the base lever for rotating the chart under control of the counterbalancing means, and a rigid, vertically disposed, underlying support for the platform passing between said drum sections to be operatively connected at its lower end with the base lever.

2. A scale comprising a load platform, a drum chart horizontally disposed directly underneath the platform and formed in separated drum sections, a shaft for the drum chart, a hollow inner chassis encompassing the chart and having vertically disposed end closures for journaling said shaft between them, counterbalancing means movable in a vertical plane generally parallel and exterior to one of the end closures and supported thereby, a base lever having its longitudinal axis generally parallel to said shaft, one end of the shaft having a portion extending slightly past that end closure which supports the counterbalancing means, a driven element on said shaft portion, a driving element engaging the driven element, a member operated by one end of the base lever, separate connections from this member to the counterbalancing means and to the driving element for operating the counterbalancing means and rotating the chart in accordance with the load, and a rigid, vertically disposed, underlying support for the platform straddling the chart shaft between the spaced sections of the chart and operatively connected at its lower end to the base lever.

3. A scale comprising a load platform, a horizontally disposed drum chart underneath the platform and formed in spaced drum sections, a shaft for the drum chart, a hollow inner chassis encompassing the chart and having vertical end closures for journaling the chart shaft between them, a base lever having its longitudinal axis generally parallel to the chart shaft and straddling the chart below the middle thereof, counterbalancing means and chart rotating means operated by the base lever, a check lever above the chart and beneath the platform, a rigid, underlying support for the platform vertically disposed in a plane passing through the space between the drum sections, and connections above and below the middle of the chart from the platform support to the check lever and base lever, respectively.

4. A scale comprising a load platform, a single, vertically disposed, underlying, central support for the platform, a check lever and a base lever connected to the support at vertically spaced points, a horizontally disposed drum chart extending between the check and base levers to lie directly underneath the platform with its axis passing through the platform support in a direction transverse to the plane of the support, the chart being formed in separate sections, one at each side of the platform support, and counterbalancing means and chart driving means operatively connected to the base lever.

5. A scale comprising a load platform, a drum chart horizontally disposed to underlie the platform, and formed in spaced drum sections, an inner chassis encompassing the chart and having generally vertical end closures for journaling the chart between them, a base lever fulcrumed on the inner chassis and underlying the chart with its longitudinal axis extending parallel to the axis of rotation of the chart, counterbalancing means and chart driving means operated by the base lever, a single, rigid, central, platform stem supporting the platform upon its upper end and vertically depending between the spaced drum sections into connection with the base lever, and an outer inverted cup-shaped case for enclosing the chart and inner chassis and having a single opening in the top through which the platform stem passes into the interior of the case to be connected to said lever.

6. A scale comprising an inner hollow chassis with vertical end members, a horizontally disposed drum chart nested within the chassis and journaled between the end members thereof, a base lever encompassing the chassis and fulcrumed thereon, a load platform above the chassis, operating connections depending from the platform to the lever, counterbalancing means operated by the lever, and chart rotating means connected to the lever.

7. A scale comprising a horizontally disposed drum chart, an inner chassis having its lower portion below and shaped to conform to and closely surround the lower half of the chart, end supports provided on the chassis for journaling the chart, a lever below the middle of the chart with its longitudinal axis extending generally parallel to the axis of rotation of the chart and bifurcated to straddle said lower chassis portion, fulcrums for the lever, fulcrum supports rigidly hung from said lower chassis portion for supporting said fulcrums, a load platform above the level of the chassis, depending operating connections from the platform to the lever, and counterbalancing means and chart rotating means operated by the lever.

8. A scale comprising a cylindrical computing chart, an inner chassis having a lower portion of generally semi-cylindrical contour substantially concentric with the chart periphery to closely surround the lower half of the chart, end supports provided on the chassis for journaling the chart between them, a base lever of open, rectangular, formation surrounding the semi-cylinder chassis portion below the middle of the chart, fulcrums externally carried by the sides of said chassis portion for fulcruming the opposite sides of the lever, a load platform above the level of the chart, a platform stem depending from the platform to the lever, counterbalancing means carried by the chassis, operating connections between the counterbalancing means and the lever, and chart rotating means controlled by the lever.

9. The scale as defined in claim 8, said chart being formed in spaced sections, said platform lying directly above said sections, said platform stem passing downwardly to the lever through the space between said sections, and the connections between the lever and counterbalancing means being from one end of the lever which extends past an end support of the chassis.

10. As a subcombination in a scale, a drum chart, a hollow inner chassis closely surrounding the chart and having vertical end closures, a shaft for the chart longer than the chassis to project past one of the end closures, a slot in the latter one of the closures open at the top to form a passage for said projecting end of the shaft when inserting the chart into the chassis, and a bearing assembly for said projecting shaft end extending transversely to the plane of the end closure and projecting externally beyond the chassis end.

11. A scale comprising a horizontally disposed computing drum chart and its shaft, an inner chassis with a lower, hollow, portion conforming in general contour to the lower portion of the chart to closely encompass the said chart portion, an open base lever branched to straddle said lower portion of the chassis, fulcrum supports rigidly provided on the exterior of the chassis and carrying fulcrums for fulcruming the base lever, a load platform above the chassis, operating connections depending from the platform to the lever, counterbalancing means carried by the exterior of the chassis, chart rotating means, and operating connections from the base lever to the counterbalancing means and the chart rotating means.

12. As a subcombination in a scale, a drum chart and shaft therefor, vertical end supports for journaling the shaft, one end of the shaft having a pinion extending past an end support, a rack for operating the pinion, a guide roller for one side of the rack carried by the last-mentioned end support, and a removable bracket secured to the latter end support provided with a bearing assembly for said shaft end and a guide roller for the other side of the rack, said bracket being removable endwise of the chart shaft.

13. As a subcombination in a scale, a check lever of sheet metal having a longitudinally extending stamped out reinforcing rib, a terminal tongue extending longitudinally from one end of the check lever and of less width than the check lever, said end of the lever being formed at opposite sides of the tongue with transversely extending, stamped knife edge shoulders, said check lever having a punched opening intermediate the shoulders with the enclosing wall of the opening having a portion formed as a knife edge extending in alignment with said knife edge shoulders, and end thrust elements engaging the alined knife edges.

14. As a subcombination in a scale, a drum chart, a chassis having a lower shell portion for encompassing the chart and having end members for journaling the chart, a lever of open, branched formation for operating the chart and encompassing the shell, fulcrum brackets carrying fulcrums for opposite branches of the lever rigidly hung from corners of the shell at the same end of the latter, and an angular reinforcing rib marking off each said corner from the rest of the shell.

15. As a subcombination in a scale, a chassis shell, a base lever, a fulcrum bracket therefor comprising a sheet metal U-shaped member, the legs of which terminate in flanges secured to a side of the shell, said legs being cut away to provide passages through which the lever may pass, a fulcrum block carried by the bracket at the side of the lever opposite the shell, and a pivot extending from the lever into bearing engagement with said fulcrum block.

16. As a subcombination in a scale, a platform, a platform spider comprising a substantially flat plate on which the platform is carried, and a pair of sheet metal plates, each with a depending angular projection forming the complementary corner of a socket when both the latter plates are welded to the flat plate, a lever, and a vertical support pivotally mounted on the lever and having its upper end shaped to fit into the said socket to carry the entire platform assembly.

17. As a subcombination in a scale, a platform structure provided with a depending collar, a platform support having its upper end shaped to fit into the collar, and means for securing the platform structure to the support comprising generally horizontally disposed threaded securing elements carried by the sides of the collar and passing loosely through the sides of the support, and generally vertically disposed clips carried by the threaded securing elements and having inclined portions engaging the support to cam the platform structure down on the top of the support when the threaded elements are tightened.

18. As a subcombination in a scale, a lever, a counterbalancing spring, a nose pivot on the lever, a connection from the nose pivot to the spring for operating the latter upon rocking of the lever, means for rotatably mounting the nose pivot in the lever, a thermostat carried by the lever, and an operating linkage connecting the thermostat to the pivot for rocking it in accordance with temperature changes to vary the power arm of the spring on the lever.

EDWARD J. VON PEIN.